US011828356B2

(12) United States Patent
Shirokoshi (10) Patent No.: US 11,828,356 B2
(45) Date of Patent: Nov. 28, 2023

(54) STRAIN WAVE GEARING PROVIDED WITH THREE-DIMENSIONAL TOOTH PROFILE

(71) Applicant: HARMONIC DRIVE SYSTEMS INC., Tokyo (JP)

(72) Inventor: Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 140 days.

(21) Appl. No.: 17/639,603

(22) PCT Filed: Oct. 30, 2020

(86) PCT No.: PCT/JP2020/040965
§ 371 (c)(1),
(2) Date: Mar. 2, 2022

(87) PCT Pub. No.: WO2022/091384
PCT Pub. Date: May 5, 2022

(65) Prior Publication Data
US 2023/0349458 A1  Nov. 2, 2023

(51) Int. Cl.
*F16H 49/00* (2006.01)
*F16H 55/08* (2006.01)

(52) U.S. Cl.
CPC ....... *F16H 49/001* (2013.01); *F16H 55/0833* (2013.01); *F16H 2049/003* (2013.01)

(58) Field of Classification Search
CPC ............... F16H 49/001; F16H 55/0833; F16H 2049/003
(Continued)

(56) References Cited

U.S. PATENT DOCUMENTS 6,167,783 B1 * 1/2001 Ishikawa ............. F16H 55/0833
74/462
6,964,210 B2 * 11/2005 Colbourne ............. B23F 15/00
74/462
(Continued)

FOREIGN PATENT DOCUMENTS

JP           S4541171 B    12/1970
JP         2012051049 A     3/2012
(Continued)

OTHER PUBLICATIONS

International Search Report (PCT/ISA/210) and Written Opinion (PCT/ISA/237) dated Dec. 15, 2020, by the Japanese Patent Office as the International Searching Authority for International Application No. PCT/JP2020/040965. (8 pages).

*Primary Examiner* — Ha Dinh Ho
(74) *Attorney, Agent, or Firm* — BUCHANAN INGERSOLL & ROONEY PC (57) ABSTRACT

A three-dimensional tooth profile of internal teeth in a strain wave gearing is a basic internal-teeth tooth profile at an internal-teeth outer end, and is a reduced tooth profile, in which the basic internal-teeth tooth profile is proportionally reduced only in the lateral direction, at other tooth-trace-direction positions. A three-dimensional tooth profile of external teeth is a basic external-teeth tooth profile at an external-teeth outer end, and is an increased tooth profile, in which the basic external-teeth tooth profile is proportionally increased only in the lateral direction, at other tooth-trace-direction positions. The tooth tip circle of an internal-teeth inner-end-side portion of the internal teeth is larger than that of other portions and does not interfere with the external teeth. The external teeth and the internal teeth mesh three-dimensionally, the teeth do not interfere at the internal-teeth inner-end side.

4 Claims, 7 Drawing Sheets

(58) Field of Classification Search
USPC .......................................................... 74/640
See application file for complete search history.

(56) References Cited

U.S. PATENT DOCUMENTS

| | | | |
|---|---|---|---|
| 8,381,608 B2 * | 2/2013 | Okamoto | ............ F16H 55/0806 74/462 |
| 9,416,861 B2 | 8/2016 | Ishikawa | |
| 9,534,681 B2 | 1/2017 | Ishikawa | |
| 9,903,459 B2 | 2/2018 | Ishikawa | |
| 10,823,259 B2 | 11/2020 | Shirokoshi et al. | |
| 2010/0319484 A1 * | 12/2010 | Kanai | ................. F16H 55/0833 409/10 |
| 2012/0057944 A1 | 3/2012 | Nagata | |
| 2017/0211678 A1 | 7/2017 | Kiyosawa et al. | |
| 2017/0343094 A1 * | 11/2017 | Tsai | ..................... F16H 49/001 |
| 2019/0264791 A1 * | 8/2019 | Atmur | ................... F16H 49/001 |

FOREIGN PATENT DOCUMENTS

| | | |
|---|---|---|
| JP | 2017044287 A | 3/2017 |
| WO | 2013046274 A1 | 4/2013 |
| WO | 2013105127 A1 | 7/2013 |
| WO | 2016006102 A1 | 1/2016 |
| WO | 2016013383 A1 | 1/2016 |
| WO | 2019077719 A1 | 4/2019 |

* cited by examiner

STRAIN WAVE GEARING PROVIDED WITH THREE-DIMENSIONAL TOOTH PROFILE

TECHNICAL FIELD

The present invention relates to a cup-shaped or top-hat-shaped strain wave gearing. More specifically, the present invention relates to a strain wave gearing having a three-dimensional tooth profile with which it is possible to form a three-dimensional meshing state in which an internally toothed gear and an externally toothed gear mesh at individual tooth-trace-direction positions.

BACKGROUND ART

A cup-shaped or top-hat-shaped strain wave gearing has a rigid internally toothed gear, a flexible cup-shaped or top-hat-shaped externally toothed gear disposed coaxially inside the internally toothed gear, and a wave generator fitted inside the externally toothed gear. The externally toothed gear is provided with a flexible cylindrical barrel part, a diaphragm extending radially from the rear end of the cylindrical barrel part, and external teeth formed on an outer peripheral surface portion on a cylindrical-barrel-part open-end side. The externally toothed gear is ellipsoidally flexed by the wave generator and meshes with the internally toothed gear at both long-axis-direction end parts of the ellipsoidal shape.

Reference rack tooth profiles (involute curve tooth profiles) for which a tooth cutting process is easy are widely employed as basic tooth profiles in strain wave gearings. Patent Document 1 (JP S45-41171 B) proposes a usage of an involute curve tooth profile.

A typically used strain wave gearing is provided with a rigid internally toothed gear, a flexible externally toothed gear, and a wave generator that causes the externally toothed gear to flex in an ellipsoidal shape and mesh with the internally toothed gear. Each tooth of the externally toothed gear is repeatedly flexed at a given amplitude in the radial direction by the wave generator, repeatedly reaching a state of meshing with the internally toothed gear and a state of coming out of mesh with the internally toothed gear. The operation trajectory of meshing of the externally toothed gear with the internally toothed gear can be approximately represented as a rack. For example, Patent Document 2 (WO2016/006102, FIG. 7) shows the state of motion of the externally toothed gear from a state of coming out of mesh with the internally toothed gear to a state of deepest meshing with the internally toothed gear (and the state of motion from a state of deepest meshing to a state of coming out of mesh).

The state of flexing of the external teeth of the ellipsoidally flexed externally toothed gear is different at individual tooth-trace-direction positions, and therefore the state of meshing with internal teeth of the internally toothed gear also is different. Even if an external-teeth tooth profile capable of forming a state of continuous meshing with the internal teeth is established in an axially perpendicular cross-section of the external teeth at one tooth-trace-direction location, a suitable meshing state will not be formed at other tooth-trace-direction positions.

In Patent Document 3 (JP 2017-44287 A), the tooth profile of an internally toothed gear is formed so as to be the same at individual tooth-trace-direction positions, while the external-teeth tooth profile is formed as a linear tooth profile and the tooth lands on both sides of the tooth profile are formed as inclined surfaces that are inclined so that the tooth thickness gradually increases along the tooth trace direction from a diaphragm-side end toward an externally-toothed-gear open-end-side end. This prevents diaphragm-side tooth tips of the external teeth from interfering with tooth tips of internal teeth in a meshing action between the external teeth and the internal teeth.

Patent Document 4 (WO2013/046274) discloses a cup-shaped or top-hat-shaped strain wave gearing, wherein the basic tooth profiles of internal teeth and external teeth are set on the basis of the movement locus of teeth of a flexible externally toothed gear relative to teeth of a rigid internally toothed gear. For the tooth profile of the internally toothed gear, the same internal-teeth basic tooth profile is employed at individual tooth-trace-direction positions. For the tooth profile of the external teeth, a tapered tooth profile is used in which the external-teeth basic tooth profile is shifted at portions on both tooth-trace-direction sides, whereby the diameter of the tooth tip circle gradually decreases in the tooth trace direction from an open-end side toward a diaphragm side. Employing a three-dimensional tooth profile that varies along the tooth trace yields not only a two-dimensional meshing state in which meshing in one axially perpendicular cross-section in the tooth trace direction is formed, but also a three-dimensional meshing state in which the external teeth mesh with the internal teeth within a wide range that follows the tooth trace direction.

Patent Document 5 (WO2019/077719) discloses a cup-shaped or top-hat-shaped strain wave gearing, wherein the tooth profile of internal teeth of a rigid internally toothed gear is formed so as to be the same at individual tooth-trace-direction positions. The tooth profile of external teeth of a flexible externally toothed gear is set as follows. The tooth-tip tooth thickness of the external teeth gradually decreases along the tooth trace direction from an external-teeth outer end on the open-end side of the externally toothed gear toward an external-teeth inner end on the diaphragm side of the externally toothed gear. Furthermore, the pressure angle at the pitch point of the external teeth gradually increases along the tooth trace direction from the external-teeth outer end toward the external-teeth inner end. The tooth profile of the external teeth is formed as a three-dimensional tooth profile that varies along the tooth trace direction, thereby yielding not only a two-dimensional meshing state in which meshing in one axially perpendicular cross-section in the tooth trace direction is formed, but also a three-dimensional meshing state in which the external teeth mesh with the internal teeth within a wide range that follows the tooth trace direction.

PRIOR ART LITERATURE

Patent Literature

Patent Document 1: JP S45-41171 B
Patent Document 2: WO2016/006102
Patent Document 3: JP 2017-44287 A
Patent Document 4: WO2013/046274
Patent Document 5: WO2019/077719

SUMMARY OF THE INVENTION

Problems to be Solved by the Invention

Typically, in a cup-shaped or top-hat-shaped strain wave gearing, in order to form a three-dimensional meshing state, the tooth profile of an internally toothed gear is formed so as to be the same along the tooth trace, and external teeth of an externally toothed gear are formed to have a three-dimensional tooth profile in which the tooth profile shape varies along the tooth trace.

The following problem is presented when the externally toothed gear is designed to have a three-dimensional meshing tooth profile. Due to restrictions in tooth cutting processes performed by a tooth-cutting machine, there are cases where it is difficult to cut a tooth profile in which the tooth thickness, the pressure angle, the tooth depth, etc., vary as designed along the tooth trace direction.

In view of this problem, it is an object of the present invention to provide a strain wave gearing in which it is possible to easily realize three-dimensional meshing across the entire tooth trace direction without incurring interference, and in which a three-dimensional tooth profile for which a tooth cutting process is easy is employed as the tooth profile shape of external teeth and internal teeth.

Means of Solving the Problems

In order to solve the abovementioned problem, according to the present invention, in a cup-shaped or top-hat-shaped strain wave gearing provided with a rigid internally toothed gear, a flexible cup-shaped or top-hat-shaped externally toothed gear, and a wave generator, when a cross-section sectioned at an orthogonal plane orthogonal to the tooth trace direction at a prescribed tooth-trace-direction position of external teeth of the externally toothed gear is set as a reference cross-section, the tooth-trace-direction end of internal teeth of the internally toothed gear on a side that corresponds to an external-teeth outer end is set as the internal-teeth outer end, and the other end of the internal teeth is set as the internal-teeth inner end, the external teeth and the internal teeth are set to three-dimensional tooth profiles as follows. A tooth profile contour shape of the external teeth in the reference cross-section is a basic external-teeth tooth profile, and a tooth profile contour shape of the internal teeth at a position of a cross-section of the internal teeth that corresponds to the reference cross-section is a basic internal-teeth tooth profile set so as to be capable of meshing with the basic external-teeth tooth profile. The internal-teeth tooth profile contour shape at individual tooth-trace-direction positions of the internal teeth is a proportionally reduced tooth profile obtained by the basic internal-teeth tooth profile being proportionally reduced only in the tooth thickness direction by a factor that corresponds to the amount of flexing of the external teeth at the individual tooth-trace-direction positions. The external teeth, when viewed along the tooth trace direction, have a tapered tooth profile of fixed tooth depth in which a root circle gradually increases in size from the external-teeth outer end toward the external-teeth inner end, and the tooth profile contour of the external teeth at individual tooth-trace-direction positions is a proportionally increased tooth profile obtained by the basic external-teeth tooth profile being proportionally increased only in the tooth thickness direction by a factor that corresponds to the amount of flexing of the external teeth at the individual tooth-trace-direction positions. In addition, in the strain wave gearing of the present invention, a tooth-trace-direction majority portion from the internal-teeth outer end toward the internal-teeth inner end of the internal teeth serves as a first internal tooth portion provided with a first tooth tip circle that is the same as the tooth tip circle of the basic internal-teeth tooth profile. By contrast, for the remaining portion of the internal teeth, which includes the internal-teeth inner end, tooth profile correction is implemented on a tooth tip portion of the proportionally reduced tooth profile so that the tooth tip portion is larger than the tooth tip circle of the basic internal-teeth tooth profile.

Thus, the three-dimensional tooth profile of the internal teeth in the strain wave gearing of the present invention is provided with the basic internal-teeth tooth profile at the internal-teeth outer end, and with a reduced tooth profile, in which the basic internal-teeth tooth profile is proportionally reduced only in the lateral direction, at other tooth-trace-direction positions. The three-dimensional tooth profile of the external teeth is provided with the basic external-teeth tooth profile at the external-teeth outer end, and with an increased tooth profile, in which the basic external-teeth tooth profile is proportionally increased only in the lateral direction, at other tooth-trace-direction positions. The tooth tip circle of an internal-teeth inner-end-side portion of the internal teeth is larger than that of other portions and does not interfere with the external teeth. The external teeth and the internal teeth mesh three-dimensionally, the teeth do not interfere at the internal-teeth inner-end side, and it is possible to realize three-dimensional tooth profiles of the external teeth and the internal teeth such that a tooth cutting process is easy.

BRIEF DESCRIPTION OF THE DRAWINGS

FIG. 2(a) shows a state prior to deformation, FIG. 2(b) shows a state of a cross-section including the long axis of an externally toothed gear that has been ellipsoidally flexed, and FIG. 2(c) shows a state of a cross-section including the short axis of the externally toothed gear that has been ellipsoidally flexed;

MODE FOR CARRYING OUT THE INVENTION

Figure 1:
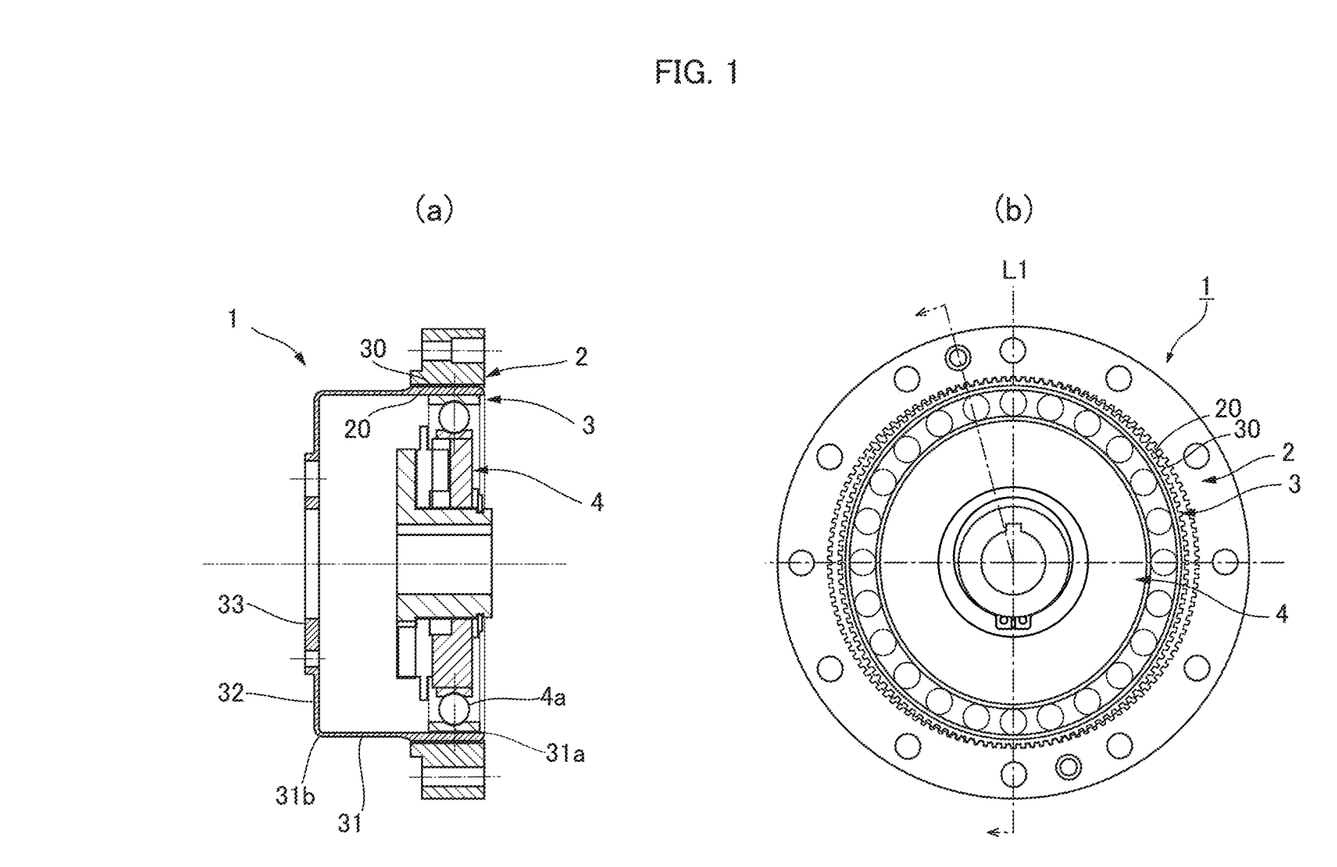
FIGS. 1(a) and 1(b) include a longitudinal cross-sectional view and an end-surface view of a cup-shaped strain wave gearing.

A strain wave gearing to which the present invention is applied is described below with reference to the accompanying drawings. FIG. 1(a) is a longitudinal cross-sectional view of one example of a cup-shaped strain wave gearing to which the present invention is applied, and FIG. 1(b) is an end-surface view of the same.

The strain wave gearing 1 has a rigid annular internally toothed gear 2, a flexible cup-shaped externally toothed gear 3 disposed coaxially inside the internally toothed gear 2, and an ellipsoidally contoured wave generator 4 fitted inside the externally toothed gear 3. The internally toothed gear 2 and the externally toothed gear 3 are spur gears having the same module (m). The difference in number of teeth between the gears is 2n (where n is a positive integer), and internal teeth 20 of the internally toothed gear 2 are more numerous. External teeth 30 of the externally toothed gear 3 are ellipsoidally flexed by the ellipsoidally contoured wave generator 4 and mesh with the internal teeth 20 of the internally toothed gear 2 at both long-axis L1-direction end portions of the ellipsoidal shape. When the wave generator 4 is rotated, the meshing positions of the teeth 20, 30 move in the circumferential direction, and relative rotation that corresponds to the difference in the number of teeth 20, 30 is generated between the gears 2, 3.

The externally toothed gear 3 is provided with: a flexible cylindrical barrel part 31; a diaphragm 32 that extends radially in continuation from a rear end 31b, which is one end of the cylindrical barrel part 31; and a rigid annular boss 33 that is continuous with the diaphragm 32. The external teeth 30 are formed on an outer-peripheral-surface portion on a side of an open end 31a, the open end 31a being the other end (front end) of the cylindrical barrel part 31. The wave generator 4 is fitted into an inner-peripheral-surface portion of an external-tooth-forming portion of the cylindrical barrel part 31 in the externally toothed gear 3. Due to the ellipsoidally contoured wave generator 4, the amount of radially outward or radially inward flexing of the cylindrical barrel part 31 in the externally toothed gear 3 gradually increases from the diaphragm-side rear end 31b toward the open end 31a.

Figure 2:
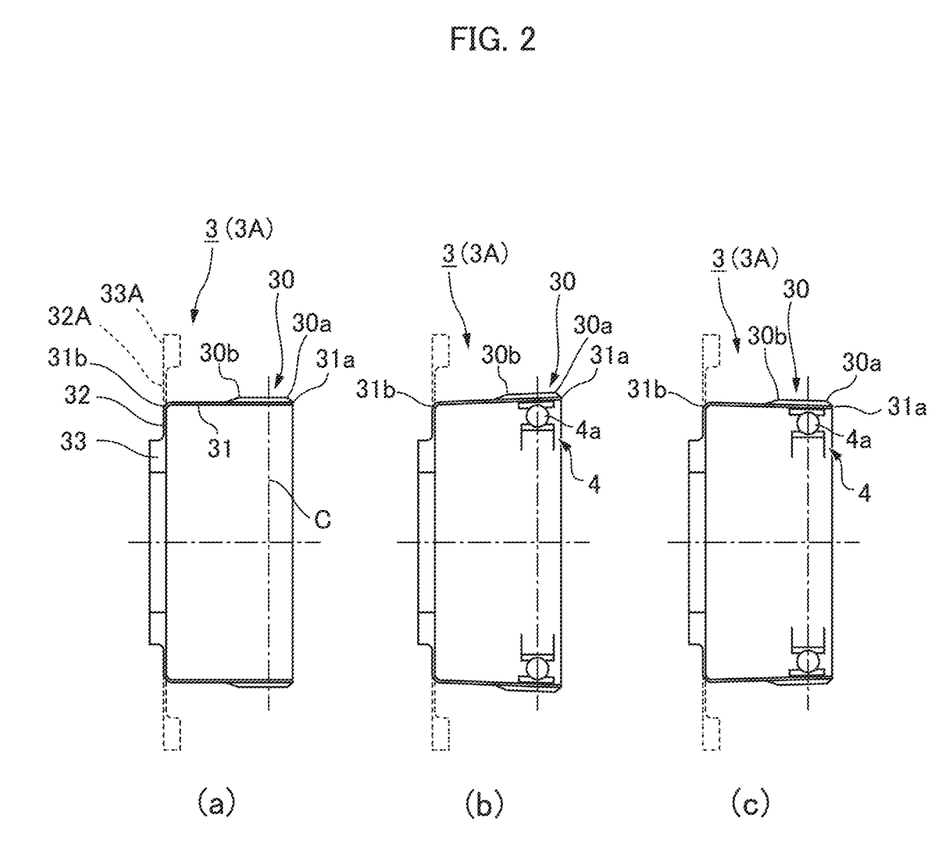
FIG. 2 is a set of schematic diagrams showing states of flexing of a cup-shaped or top-hat-shaped externally toothed gear, where

FIG. 2 shows states in which the cup-shaped externally toothed gear 3 is ellipsoidally flexed, where FIG. 2(a) is a cross-sectional view of a state prior to deformation, FIG. 2(b) is a cross-sectional view of long-axis positions on an ellipsoidal curve after deformation, and FIG. 2(c) is a cross-sectional view of short-axis positions on the ellipsoidal curve after deformation. The dashed lines in FIGS. 2(a) to 2(c) show a top-hat-shaped externally toothed gear 3A. In the top-hat-shaped externally toothed gear 3A, a diaphragm 32A extends radially outward from the rear end 31b of the cylindrical barrel part 31, and an annular boss 33A is formed on the outer peripheral end of the diaphragm 32A. The state of flexing of the external-tooth-forming portion of the externally toothed gear 3A is similar to that of the cup-shaped externally toothed gear 3.

As shown in FIG. 2(b), within a cross-section including the long axis L1 of the ellipsoidal curve, the amount of outward flexing gradually increases in proportion with the distance from the rear end 31b to the open end 31a. As shown in FIG. 2(c), in a cross-section including a short axis L2 of the ellipsoidal curve, the amount of inward flexing gradually increases in proportion with the distance from the rear end 31b to the open end 31a. The amount of flexing of the external teeth 30 formed on the open-end 31a-side outer-peripheral-surface portion varies in each axially perpendicular cross-section in the tooth trace direction. Specifically, the amount of radial flexing in the tooth trace direction of the external teeth 30 gradually increases, from a diaphragm-side external-teeth inner end 30b toward an open-end 31a-side external-teeth outer end 30a, in proportion with the distance from the rear end 31b.

Figure 3:
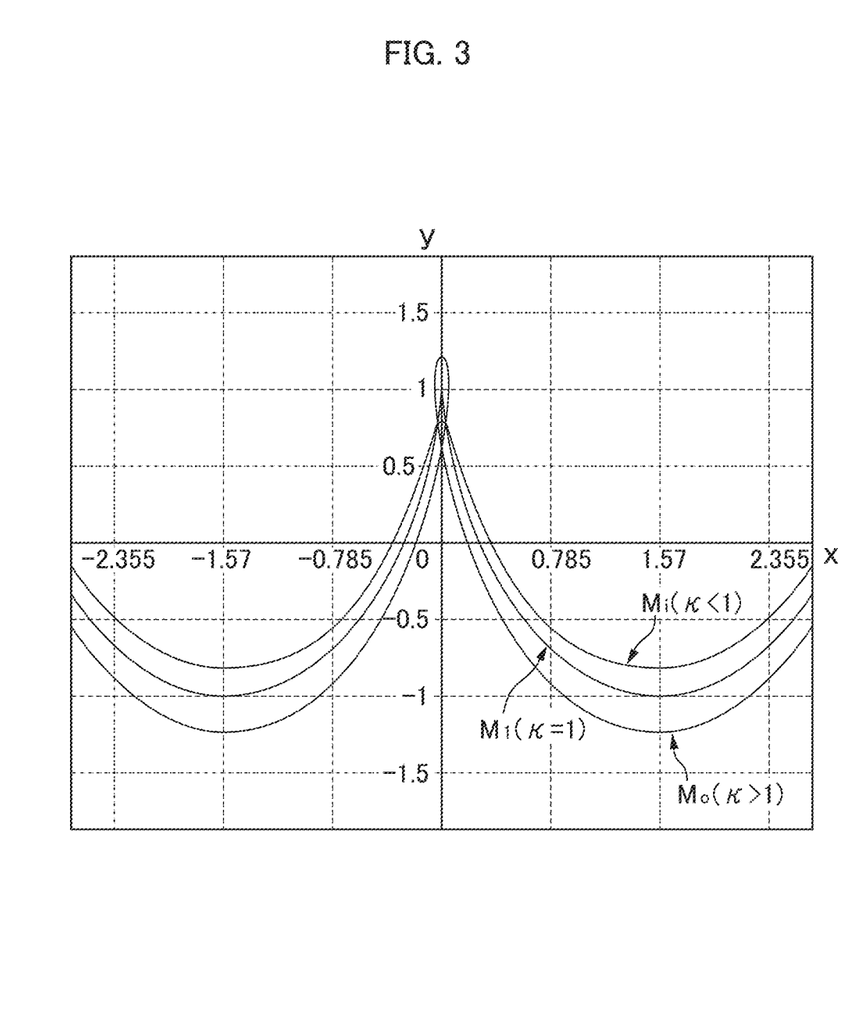
FIG. 3 is a schematic diagram showing three examples of the movement locus of external teeth relative to internal teeth in a discretionary axially perpendicular cross-section in the tooth trace direction of a tooth profile.

FIG. 3 shows three examples of the movement locus of the external teeth 30 of the externally toothed gear 3 relative to the internal teeth 20 of the internally toothed gear 2 in the strain wave gearing 1. In an axially perpendicular cross-section at a discretionary position in the tooth trace direction of the external teeth 30 of the externally toothed gear 3, the amount of flexing of the external teeth 30 at a position on the long axis L1 in an ellipsoidal rim-neutral line, relative to that in a rim-neutral circle before the external teeth 30 ellipsoidally flex, is represented by 2κmn, where κ is a coefficient of flexing.

The origin point of the y axis in FIG. 3 is the average position of the amplitudes of the movement locus. Within the movement locus, a non-deflection movement locus $M_1$ is obtained in the case of a standard state of flexing with no deflection and with a flexing coefficient κ equal to 1, a positive-deflection movement locus $M_0$ is obtained in the case of a state of flexing with positive deflection and with a flexing coefficient κ greater than 1, and a negative-deflection movement locus $M_1$ is obtained in the case of a state of flexing with negative deflection and with a flexing coefficient κ less than 1. An axially perpendicular cross-section at discretionary tooth-trace-direction positions, e.g., at the position of a diameter line C passing through the center of balls 4a in a wave bearing, or at the position of an open-end 31a-side external-teeth outer end 30a (refer to FIG. 2), is set as a reference cross-section. In the reference cross-section, the amount of flexing is set so as to obtain the non-deflection movement locus with a flexing coefficient κ equal to 1.

Example of Three-Dimensional Tooth Profiles

In the present example, on the basis of the amount of radial flexing of the external teeth 30 at individual tooth-trace-direction positions of the external teeth 30, both the tooth profile of the external teeth 30 and the tooth profile of the internal teeth 20 are formed as three-dimensional tooth profiles in which the tooth profile shape gradually varies along the tooth trace direction of the respective teeth. An example of the tooth profile shapes of the internal teeth 20 and the external teeth 30 is described below.

Figure 4:
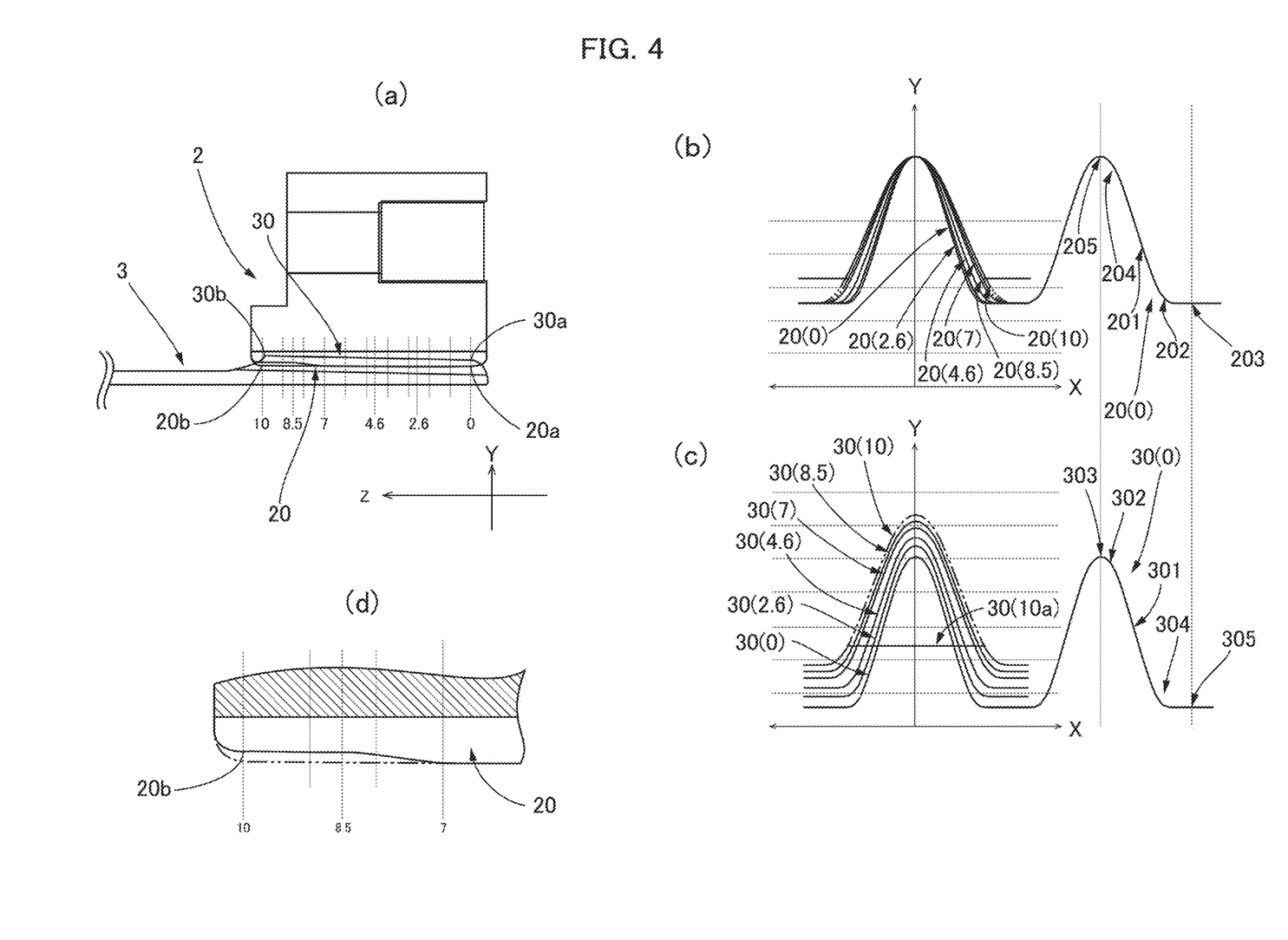
FIG. 4(a) is a schematic diagram showing the tooth-trace-direction tooth profile shape of internal teeth and external teeth.
FIG. 4(b) is a schematic diagram showing the tooth profile shape in each tooth-trace-direction cross-section of the internal teeth.
FIG. 4(c) is a schematic diagram showing the tooth profile shape in each tooth-trace-direction cross-section of the external teeth.
FIG. 4(d) is a schematic diagram showing a tooth profile correction portion of the internal teeth.

FIG. 4(a) is a schematic diagram showing the tooth-trace-direction contour shapes of the internal teeth 20 of the internally toothed gear 2 and the external teeth 30 of the externally toothed gear 3. FIG. 4(b) is a schematic diagram showing the tooth profile contour shape at positions in each tooth-trace-direction cross-section of the internal teeth 20 (cross-section sectioned at an orthogonal cross-section orthogonal to the tooth trace direction). FIG. 4(c) is a schematic diagram showing the tooth profile contour shape at positions in each tooth-trace-direction cross-section of the external teeth 30 (cross-sections sectioned at an orthogonal cross-section that is orthogonal to the tooth trace direction). FIG. 4(d) is a schematic diagram showing an exlarged view of an internal-teeth inner-end portion of the internal teeth 20. In these diagrams, X is defined as the tooth thickness direction, Y is defined as the tooth depth direction, Z is defined as the tooth trace direction, the position of the cross-section where Z equals 0 is set as an internal-teeth outer end 20a, and the position of the cross-section where Z equals 10 is set as an internal-teeth inner end 20b.

The tooth profile contour shape of the internal teeth 20 is a three-dimensional tooth profile that gradually changes along the tooth trace. For example, at the position of the cross-section of the internal-teeth outer end 20a (where Z=0)

along the tooth trace direction Z, the tooth profile contour shape of the internal teeth 20 is set as a basic internal-teeth tooth profile 20(0). The tooth profile at other tooth-trace-direction positions of the cross-sections of the internal teeth 20 is a proportionally reduced tooth profile, in which the basic internal-teeth tooth profile 20(0) is proportionally reduced only in the lateral direction by a reduction factor that is set in accordance with the amount of flexing at the position of the corresponding external teeth 30.

FIG. 4(b) shows the basic internal-teeth tooth profile 20(0) at the position of the cross-section where the value of Z is "0" (internal-teeth outer end 20a), as well as proportionally reduced tooth profiles 20(2.6), 20(4.6), 20(7), 20(8.5), and 20(10) at five respective positions of the cross-sections where the value of Z is "2.6," "4.6," "7," "8.5," and "10" (internal-teeth inner end 20b), in a state of overlapping a cross-section in which Z equals 0. For example, the position where Z equals 0 is a position at which the flexing coefficient κ is equal to 1.

The reduction factor in the lateral direction, i.e., in the tooth thickness direction X of the proportionally reduced tooth profiles at individual positions of the cross-sections of the internal teeth 20 along the tooth trace direction Z, decreases in a substantially proportional manner with respect to the distance along the tooth trace direction Z from the internal-teeth outer end 20a to individual positions of cross-sections. The tooth depth of the internal teeth 20 is fixed in the tooth trace direction. In addition, the tooth thickness decreases and the pressure angle at the pitch point gradually increases in accordance with the tooth-trace-direction distance from the internal-teeth outer end 20a. For example, the proportionally reduced tooth profile 20(10) at the position of the cross-section of the internal-teeth inner end 20b (Z=10) has a shape that is proportionally reduced by a factor of 1.3 in the lateral direction, where the factor for the basic internal-teeth tooth profile 20(0) at the position of the cross-section of the internal-teeth outer end 20a is set as "1."

The tooth profile of the external teeth 30 is also a three-dimensional tooth profile that gradually varies along the tooth trace. In the present example, at the position of the cross-section of the external-teeth outer end 30a (Z=0) along the tooth trace direction Z, the tooth profile contour shape of the external teeth 30 is set as a basic external-teeth tooth profile 30(0) that is capable of meshing with the basic internal-teeth tooth profile 20(0) at the internal-teeth outer end 20a of the internal teeth 20. For example, the external teeth 30 have a tapered tooth profile of fixed tooth depth, and are such that the tooth tip circle gradually increases in size from the external-teeth outer end 30a toward the external-teeth inner end 30b. The tooth tip circle increases in size in accordance with the amount of flexing at individual tooth-trace-direction positions (increases in size in accordance with the distance from the external-teeth outer end 30a).

The external-teeth outer end 30a is set at the position of the cross-section where Z equals 0, and the external-teeth inner end 30b is set at a position of a cross-section slightly inward from that where Z equals 10. The tooth profile at other positions of the cross-sections of the external teeth 30 along the tooth trace direction Z is a proportionally increased tooth profile, in which the basic external-teeth tooth profile 30(0) is proportionally increased only in the lateral direction. FIG. 4(c) shows the basic external-teeth tooth profile 30(0) at the position of the cross-section where the value of Z is "0" (external-teeth outer end 30a), as well as proportionally increased tooth profiles 30(2.6), 30(4.6), 30(7), 30(8.5), and 30(10) at five respective positions of cross-sections where the value of Z is "2.6," "4.6," "7," "8.5," and "10." The position of the cross-section where Z equals 10 in the external teeth 30 is offset from the external-teeth inner end 30b (offset from the effective tooth width), and the tooth depth is low.

Specifically, the proportionally increased tooth profile 30(10) indicated by a virtual line is modified to have the shape indicated by the real line 30(10a).

The increase factor in the lateral direction, i.e., in the tooth thickness direction X of the proportionally increased tooth profiles at individual tooth-trace-direction Z positions of the cross-sections of the external teeth 30, increases in a substantially proportional manner with respect to the tooth-trace-direction Z distance from the external-teeth outer end 30a to individual positions of cross-sections. Therefore, the tooth thickness increases and the pressure angle at the pitch point increases in accordance with the tooth-trace-direction distance from the external-teeth outer end 30a. For example, the proportionally increased tooth profile 30(10) at the position of the cross-section of the external-teeth inner end 30b has a shape such that the basic external-teeth tooth profile 30(0) at the position of the cross-section of the external-teeth outer end 30a is proportionally increased by a factor of "1.3" in the lateral direction.

The basic internal-teeth tooth profile 20(0) at the position of the cross-section of the internal-teeth outer end 20a (position of reference cross-section) and the basic external-teeth tooth profile 30(0) at the position of the cross-section of the external-teeth outer end 30a (position of reference cross-section) can be established according to a well-known method for setting tooth profiles.

The tooth profile contour (tooth land shape) in the basic internal-teeth tooth profile 20(0) of the internal teeth 20 is provided with a meshing tooth land portion 201 that meshes with the counterpart external teeth 30 of the externally toothed gear 3. One end of a tooth-tip-side tooth land portion 202 defined by a convex curve and a straight line is smoothly linked to the addendum-side end of the meshing tooth land portion 201. The tooth-tip-side tooth land portion 202 extends from the tooth-tip-side end of the meshing tooth land portion 201 to a tooth-tip top part 203 of the internal teeth 20. Moreover, one end of a root-side tooth land portion 204 defined by a concave curve is smoothly linked to the dedendum-side end of the meshing tooth land portion 201. The root-side tooth land portion 204 extends from the dedendum-side end of the meshing tooth land portion 201 to a root deepest part 205 (tooth groove center position) of the internal teeth 20.

Similarly, the basic external-teeth tooth profile 30(0) of the external teeth 30 is provided with a meshing tooth land portion 301 that meshes with the counterpart internal teeth 20. One end of a tooth-tip-side tooth land portion 302 defined by a convex curve is smoothly linked to the addendum-side end of the meshing tooth land portion 301. The tooth-tip-side tooth land portion 302 extends from the tooth-tip-side end to a tooth-tip top part 303 of the external teeth 30. Moreover, one end of a root-side tooth land portion 304 defined by a concave curve and a straight line is smoothly linked to the dedendum-side end of the meshing tooth land portion 301. The root-side tooth land portion 304 extends from the dedendum-side end of the meshing tooth land portion 301 to a root deepest part 305 (tooth groove center position) of the external teeth 30.

The tooth profile shape defining the meshing tooth land portions 201, 301 of the internal teeth 20 and the external teeth 30 is defined by a tooth profile curve such as an involute curve tooth profile, which is employed in the prior art. It is also permissible to derive the movement locus of the external teeth 30 relative to the internal teeth 20 and use part of a curve that represents said movement locus to set the tooth profile of the meshing tooth land portions of the internal teeth and the external teeth. For example, a tooth profile curve can be defined as disclosed in JP SHO63-115943 A and JP SHO64-79448 A. According to these documents: a curve portion in a prescribed range is extracted from meshing boundary points on the movement locus of the external teeth 30, the meshing boundary points being obtained when meshing of the external teeth 30 with the internal teeth 20 is approximated as rack meshing; and a tooth profile curve of the meshing tooth land portions of the internal teeth and the external teeth is set on the basis of a curve similar to the curve portion.

However, the tooth-tip-side tooth land portions 202, 302 and the root-side tooth land portions 204, 304 in the basic internal-teeth tooth profile 20(0) and the basic external-teeth tooth profile 30(0) do not contribute to meshing. Basically, these portions can be defined by discretionary convex curves, concave curves, and straight lines that do not interfere with counterpart-side teeth.

(Correction of Tooth Profile in Internal-Teeth Inner-End-Side Portion)

Figure 5:
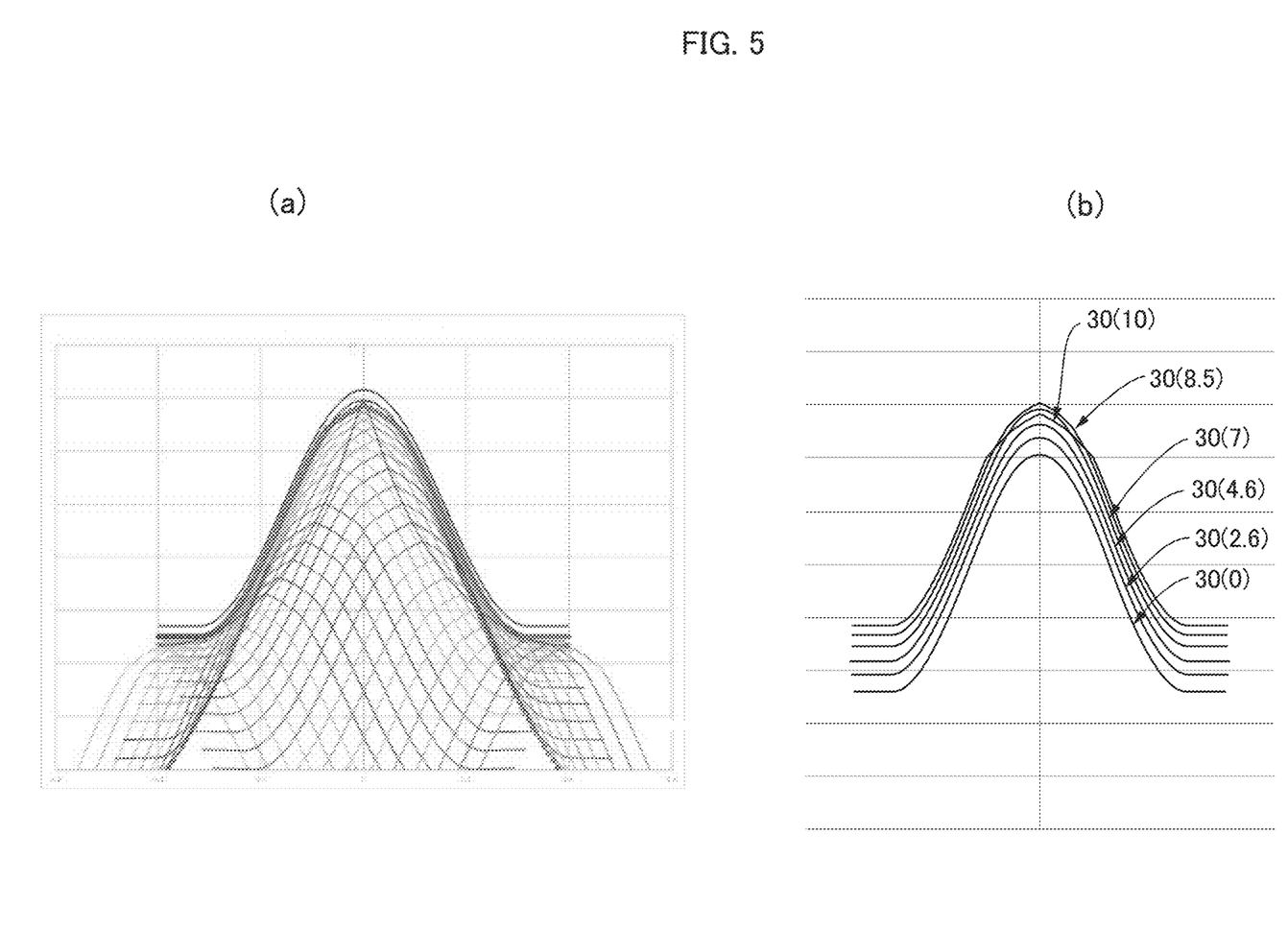
FIGS. 5(a) and 5(b) are schematic diagrams showing a tooth profile shape in a case where tooth profile correction is implemented on a tooth-tip-side tooth land portion in an internal-teeth inner-end-side portion of internal teeth so that the internal teeth do not interfere with external teeth.

FIG. 5(a) is a schematic diagram showing an internal-teeth inner-end 20b-side meshing state of the internal teeth 20 and the external teeth 30, the meshing state being one in which the tooth profile shape at individual tooth-trace-direction positions is set as described above. FIG. 5(a) shows the meshing state at the position of the cross-section where Z equals 8.5. As shall be apparent from FIG. 5(a), the approach angle of the movement locus of the internal teeth 20 ($\kappa$<1) relative to the external teeth 30 is shallow. Therefore, in meshing on the internal-teeth inner-end 20b side, there is a concern that the tooth-tip-side tooth land portion 302 of the external teeth 30 will interfere with the tooth-tip-side tooth land portion 202 of the internal teeth 20.

It is necessary to define the shape of the tooth-tip-side tooth land portion on the external-teeth inner-end 30b side of the external teeth 30 so that the movement curve at individual tooth-trace-direction positions of the cross-sections on the external-teeth inner-end 30b side of the external teeth 30 does not interfere with the internal teeth 20. FIG. 5(b) is a schematic diagram showing the tooth profile shape of the external teeth 30 at individual positions of cross-sections, the tooth profile shape being set so that, at individual tooth-trace-direction positions of cross-sections, the external teeth 30 do not interfere with the internal teeth 20. As shall be apparent from FIG. 5(b), at external-teeth inner-end 30b-side positions of cross-sections (Z=8.5 and Z=10), the curve defining the tooth-tip-side tooth land portion is complex in the manner of a two-part broken curve and is difficult to produce.

Thus, in the strain wave gearing 1 in the present example, in order to avoid interference by the tooth tip portions of the external teeth 30, the tooth-tip-side tooth land portion 202 in the tooth profile of the internal teeth 20, which is set as a proportionally reduced tooth profile as described above, is relieved (separated) from the external teeth 30. This relationship is described with reference to FIG. 4(d). Specifically, the tooth tip circle from the tooth-trace-direction position of the cross-section where Z equals 0 to that where Z equals 7 in the internal teeth 20 is formed as a first tooth tip circle that remains the same as in the basic internal-teeth tooth profile 20(0). However, from the position of the cross-section where Z equals 10, which is the internal-teeth inner end 20b, to that where Z equals 8.5, the tooth-tip-side tooth land portion in the tooth profile of the internal teeth 20 is corrected so as to have a somewhat larger tooth tip circle (second tooth tip circle). From the position of the cross-section where Z equals 7 to that where Z equals 8.5, the tooth tip circle gradually increases in size in the tooth trace direction from the first tooth tip circle to the second tooth tip circle.

Figure 6:
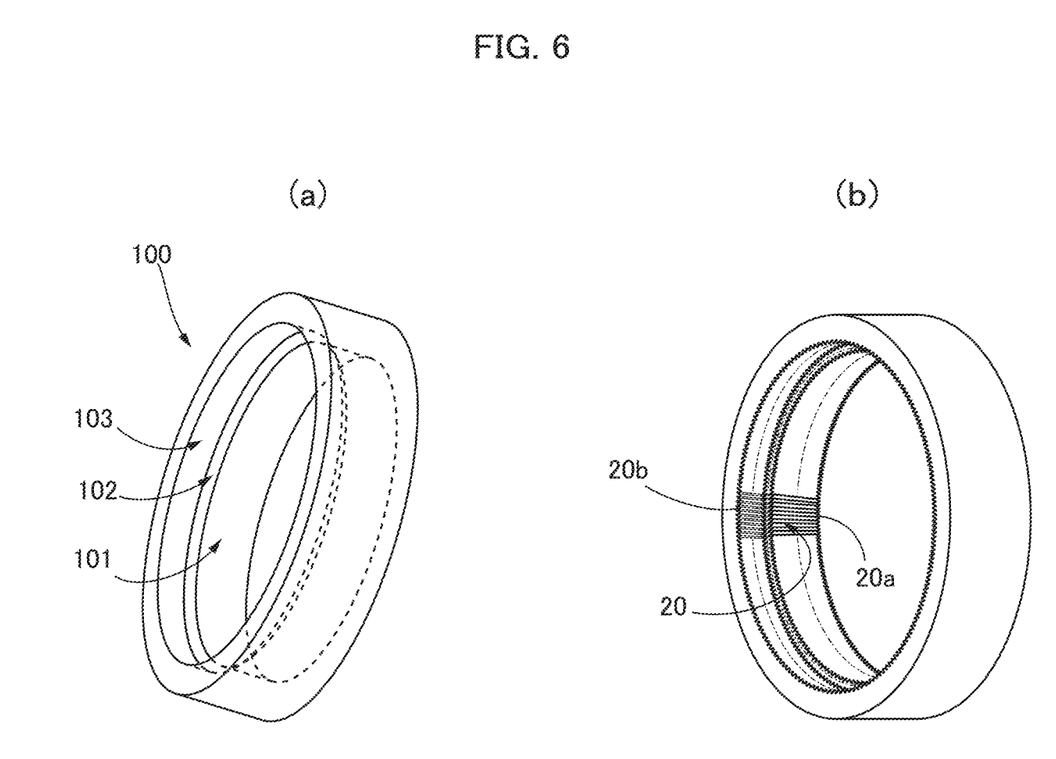
FIG. 6(a) is a schematic diagram showing a blank of the internally toothed gear prior to a tooth cutting process.
FIG. 6(b) is a schematic diagram showing the blank after the tooth cutting process.

A tooth cutting process for the internally toothed gear 2, in which the tooth tip circle varies in this manner, can be performed using, e.g., a blank for an internally toothed gear having the shape shown in FIG. 6. As shown in FIG. 6(a), the blank 100 is an overall cylindrical member that, from one end to the other end along the axial direction (tooth trace direction of internal teeth), is provided with: a first cylinder portion 101, the inside diameter dimension of which corresponds to the inside diameter of the first tooth tip circle; a second cylinder portion 102 provided with a tapered inner peripheral surface, the inside diameter dimension of which gradually increases from the inside diameter of the first tooth tip circle to the inside diameter of the second tooth tip circle; and a third cylinder portion 103, the inside diameter dimension of which corresponds to the inside diameter of the second tooth tip circle. Implementing a tooth cutting process on the circular inner peripheral surface of the blank makes it possible to easily produce an internal-teeth tooth profile in which tooth profile correction for avoiding interference with the tooth tips of the external teeth 30 has been implemented in an internal-teeth inner-end 20b-side portion, as shown in FIG. 6(b).

FIGS. 7(a) to 7(f) are schematic diagrams showing the state of meshing of the external teeth 30 with the internal teeth 20 at individual tooth-trace-direction positions of the cross-sections of the external teeth 30. In order to display the state of meshing of the external teeth 30 with the internal teeth 20 in an easy-to-understand manner, FIGS. 7(a) to 7(f) show, as tooth profile curves representing the internal teeth 20, two curves, specifically a curve that represents the tooth profile of the internal teeth 20 in which there is zero backlash in meshing with the external teeth 30 and a curve in which said tooth profile is slightly shifted in a direction away from the external teeth in the radial direction.

Figure 7:
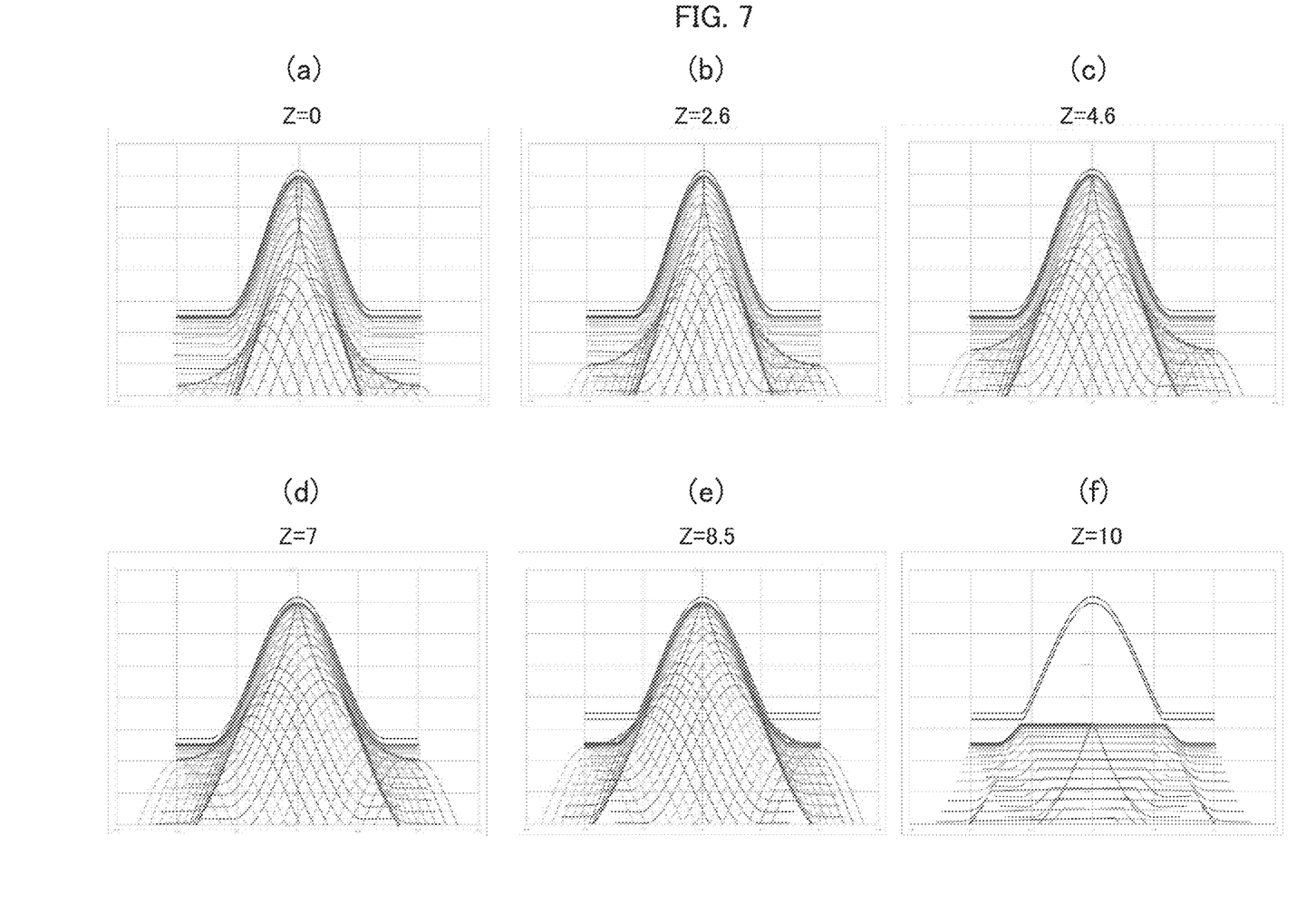
FIGS. 7(a) to 7(f) are schematic diagrams showing states of meshing of external teeth with internal teeth at individual tooth-trace-direction positions of cross-sections.

As shown in these diagrams, it is understood that a three-dimensional meshing state for meshing of the external teeth 30 with the internal teeth 20 is formed at individual tooth-trace-direction positions of cross-sections. It is also understood that the tooth profile of the internal teeth 20 is corrected so that the tooth tip circle increases in size at portions on the internal-teeth inner-end 20b side in the tooth trace direction (Z=8.5-10), and interference with the external teeth 30 is avoided. As mentioned previously, the position of the internal-teeth inner end 20b (Z=10) is set apart from the effective tooth width of the external teeth 30 (said position is further toward the diaphragm side than the external-teeth inner end 30b), the tooth tips of the external teeth 30 decrease in size, and, as shown in FIG. 7(f), it is therefore impossible for interference with the external teeth 30 to occur, irrespective of the teeth.

As described above, a three-dimensional tooth profile (tooth thickness, pressure angle) that varies gradually along the tooth trace is employed as the tooth profile of the internal teeth 20 and the external teeth 30 in the strain wave gearing 1. Configuring both tooth profiles as three-dimensional tooth profiles allows for the amount of tooth-trace-direction variation in the three-dimensional tooth profiles (amount of variation in tooth thickness, pressure angle, tooth depth, tooth tip circle diameter, etc.) to be smaller than when only the tooth profile of the external teeth is configured as a three-dimensional tooth profile in order to realize three-dimensional meshing between the two gears. Thus, restrictions on the tooth cutting process are alleviated and tooth cutting processes for external teeth and internal teeth that are capable of realizing three-dimensional meshing are easier than when only the external teeth are configured to have a three-dimensional tooth profile.

A basic internal-teeth tooth profile and a basic external-teeth tooth profile that are capable of meshing with each other are set for the internal teeth and the external teeth in a reference cross-section that is set at a prescribed tooth-trace-direction position. At other tooth-trace-direction positions, there are employed tooth profiles in which the aforementioned tooth profiles are proportionally reduced or increased in size in only the lateral direction (tooth thickness direction) by a factor that corresponds to the amount of flexing of the external teeth at individual tooth-trace-direction positions.

For example, the tooth cutting process for the internal teeth can be performed through a skiving process. In this case, the angle of intersection of a tool tooth profile provided with a basic tooth profile relative to a workpiece is preferably varied gradually in association with tooth-trace-direction movement. The tooth cutting process for the external teeth can be performed through a hobbing process. In this case, a tool tooth profile in which the thickness varies continuously in the tooth trace direction is created, and a hob is shifted to match movement in the tooth trace direction during the tooth cutting process. At the same time, the distance between the workpiece and the hob is changed gradually in association with the tooth-trace-direction movement, thereby making it possible to realize a tapered tooth profile in which the tooth tip circle gradually increases in size along the tooth trace direction. Thus, it is easier to process three-dimensional tooth profiles for external teeth and internal teeth than the three-dimensional tooth profiles in the prior art, which were employed in external teeth.

Furthermore, a tooth-trace-direction majority portion from the internal-teeth outer end toward the internal-teeth inner end of the internal teeth serves as a first internal tooth portion provided with a first tooth tip circle that is the same as the tooth tip circle of the basic internal-teeth tooth profile. For the remaining portion of the internal teeth, which includes the internal-teeth inner end, tooth profile correction is implemented on a tooth tip portion of the proportionally reduced tooth profile so that the tooth tip portion is larger than the tooth tip circle of the basic internal-teeth tooth profile. In meshing of external teeth of a cup-shaped or top-hat-shaped externally toothed gear with internal teeth of a cylindrical internally toothed gear, the movement locus of the external-teeth inner-end-side portion of the external teeth (portion of the external teeth closer to the diaphragm) has a shallow approach angle with respect to the internal teeth, and the tooth tip portions of the external teeth could interfere with the tooth tip portions of the internal teeth. In the present invention, because the tooth tip circle of the internal teeth on the internal-teeth inner-end side is increased in size to a greater extent than in other tooth-trace-direction portions, the tooth tips of the internal teeth can be separated from the tooth tips of the external teeth so as not to interfere therewith. This makes it possible to reliably avoid interference between the teeth.

Because it is sufficient for the tooth tip circle in the internal-teeth inner-end portion to simply be increased in size, it is possible to implement tooth profile correction for avoiding interference more easily than when correction is implemented in a curve defining the internal-teeth tooth tip portion. For example, by preparing, as a cylindrical blank for the internally toothed gear, a cylindrical body in which the inside diameter varies along the tooth trace direction of the internal teeth, and implementing a tooth cutting process on the inner peripheral surface of the blank, it is possible to easily process an internally toothed gear provided with internal teeth having a three-dimensional tooth profile in which the tooth tip circle varies along the tooth trace direction.

Other Embodiments

The description above is an example of a case where the present invention is applied to a cup-shaped strain wave gearing. The present invention can similarly be applied to a top-hat-shaped strain wave gearing as well.

The invention claimed is:

1. A strain wave gearing comprising: a rigid internally toothed gear; a flexible externally toothed gear disposed coaxially inside the internally toothed gear; and a wave generator fitted inside the externally toothed gear, wherein the externally toothed gear is provided with a flexible cylindrical barrel part, a diaphragm that extends radially from a rear end of the cylindrical barrel part, and external teeth formed on an open-end side outer peripheral surface portion of the cylindrical barrel part, the open-end side being a front-end side of the cylindrical barrel part;

the cylindrical barrel part of the externally toothed gear is flexed in an ellipsoidal shape by the wave generator, and the external teeth mesh with internal teeth of the internally toothed gear at both long-axis-direction end portions of the ellipsoidal shape; and when the external teeth of the externally toothed gear in an ellipsoidally flexed state are sectioned along a plane that includes a center axis and a long axis of the ellipsoidal shape, an amount of radially outward flexing increases in proportion to a distance from the diaphragm, along a tooth trace direction, from a diaphragm-side external-teeth inner end toward an open-end-side external-teeth outer end, wherein, when a cross-section sectioned at an orthogonal plane orthogonal to the tooth trace direction at a prescribed tooth-trace-direction position of the external teeth is set as a reference cross-section, a tooth-trace-direction end of the internal teeth on a side that corresponds to the external-teeth outer end is set as an internal-teeth outer end, and the other end of the internal teeth is set as an internal-teeth inner end:

a tooth profile contour shape of the external teeth in the reference cross-section is a basic external-teeth tooth profile;

a tooth profile contour shape of the internal teeth at a position of a cross-section of the internal teeth that corresponds to the reference cross-section is a basic internal-teeth tooth profile capable of meshing with the basic external-teeth tooth profile;

an internal-teeth tooth profile contour shape at individual tooth-trace-direction positions of the internal teeth is a proportionally reduced tooth profile obtained by the basic internal-teeth tooth profile being proportionally reduced only in a tooth thickness direction thereof by a factor that is set in accordance with an amount of flexing of the external teeth at the individual tooth-trace-direction positions;

the external teeth, when viewed along the tooth trace direction, have a tapered tooth profile of fixed tooth depth in which a root circle gradually increases in size from the external-teeth outer end toward the external-teeth inner end;

a tooth profile contour of the external teeth at individual tooth-trace-direction positions is a proportionally increased tooth profile obtained by the basic external-teeth tooth profile being proportionally increased only in a tooth thickness direction thereof by a factor that is set in accordance with the amount of flexing at the individual tooth-trace-direction positions;

a tooth-trace-direction majority portion from the internal-teeth outer end toward the internal-teeth inner end of the internal teeth serves as a first internal tooth portion provided with a first tooth tip circle that is the same as a tooth tip circle of the basic internal-teeth tooth profile; and for the remaining portion of the internal teeth, which includes the internal-teeth inner end, tooth profile correction is implemented on a tooth tip portion of the proportionally reduced tooth profile so that the tooth tip portion is larger than the tooth tip circle of the basic internal-teeth tooth profile.

2. The strain wave gearing according to claim 1, wherein each of the basic internal-teeth tooth profile and the basic external-teeth tooth profile is provided with:

a meshing tooth land portion that meshes with tooth lands of the counterpart gear;

a tooth-tip-side convex tooth land portion extending from an addendum-side end of the meshing tooth land portion to a tooth-tip top part; and a root-side concave tooth land portion extending from a dedendum-side end of the meshing tooth land portion to a root deepest part, and wherein a tooth profile curve defining the meshing tooth land portion is an involute curve, or is a similar curve obtained through similarity transformation of part of a movement curve obtained when meshing of the external teeth with the internal teeth at the position of the reference cross-section is approximated as rack meshing.

3. The strain wave gearing according to claim 1, wherein a portion of the internal teeth that includes the internal-teeth inner end serves as a second internal tooth portion provided with a second tooth tip circle that is larger than the first tooth tip circle; and a portion of the internal teeth located between the first internal tooth portion and the second internal tooth portion is a tapered internal tooth portion in which the tooth tip circle gradually increases in size from the first tooth tip circle to the second tooth tip circle.

4. The strain wave gearing according to claim 3, wherein the first internal tooth portion of the internal teeth has a length of 7/10 of an effective tooth width of the internal teeth; and the second internal tooth portion and the tapered internal tooth portion each have a length of 1.5/10 of the effective tooth width.

* * * * *